3,149,038
THIN FILM COATING FOR TABLETS AND THE
LIKE AND METHOD OF COATING
Sampson F. Jeffries, Indianapolis, Ind., assignor to The Dow Chemical Company, Midland, Mich., a corporation of Delaware
No Drawing. Filed Sept. 5, 1961, Ser. No. 135,772
7 Claims. (Cl. 167—82)

This invention relates to tablets and other individual dosage forms which are characterized by a thin film coating of a water-permeable plastic composition, and to the method of making such tablets and dosage forms. The invention also relates to an improved thin, water-permeable tablet coating film, and to a liquid composition useful for laying down the aforementioned film.

The advantages of film coating of tablets over sugar coating are well recognized. Heretofore, thin film tablet coatings containing cellulose acetate phthalate have been taught broadly. However, the coating compositions specifically taught which contain polyethylene glycols having a molecular weight of about 2,000 to 6,000 have suffered from the disadvantage that they cannot be satisfactorily used for the coating of certain drugs and drug mixtures. For example, it has been found that the said polyethylene glycols cannot be used in the coating of salicylates and salicylate derivatives, such as aspirin, because of the formation of a gummy mass when applied thereto. Moreover, the tablet coatings obtained using the prior art compositions leave something to be desired in the way of smoothness, so that it is desirable to improve over the general appearance of tablets coated with those compositions.

It is, therefore, a principal objective of the present invention to overcome the disadvantages of known film coatings and coating compositions.

According to the present invention, there is now provided a tablet coating composition which is comprised of a portion of a water-soluble, high molecular weight polymer of ethylene oxide and a portion of cellulose acetate phthalate. Several other ingredients may be added to the previously-named ingredients in order to enhance the properties of the coating obtained from the composition. Among the more important of these additional materials are plasticizing agents, opaquing agents, coloring materials and possibly wetting agents and drying agents.

The high molecular weight ethylene oxide polymers used in the present composition have molecular weights in the range of from about 200,000 to 5 million. These polymers are truly plastic, yet they are soluble in water, as well as many non-aqueous solvents. They have softening points in the range of 65°–70° C. A particularly suitable polymer, sold under the trademark "Polyox," and designated as "Polyox WSR–35," is characterized by both a molecular weight above about 200,000 and a melt viscosity at 150° C. in the range of 15,000 to 16,000 poises.

The cellulose acetate phthalate is a well-known polycarboxycylic acid partial ester of cellulose acetate.

Suitable plasticizing agents include diethyl phthalate, castor oil, corn oil, sesame oil and propylene glycol, as well known in the art. A particularly suitable plasticizing agent is a combination of about 1 part of diethyl phthalate per 3 parts of castor oil.

Among the coloring agents which may be used in the practice of this invention are any of the non-toxic dyes, lakes and pigments which can be dissolved in or otherwise dispersed in the solvent employed in the coating composition, and which have been certified for use in the food, drug and cosmetic industries as D. and C., or F.D. and C. colorants. For example, it has been found that dyes of the type represented by red F.D. and C. #3, green F.D. and C. #2, yellow F.D. and C. #5, violet F.D. and C. #1, red D. and C. #35, orange D. and C. #17 and green D. and C. #6 are suitable for use as colorants in the coating composition. Among the pigments which are suitable are Mapico Yellow AN–1 (yellow hydrated iron oxide), Mapico Brown AN–18 (brown hydrated iron oxide), Mapico Red AN–3 (red iron oxide) and Raven #15 Black (carbon black).

Many lakes are found suitable in the practice of this invention. A lake is a dye which has been precipitated on an insoluble metal compound. To meet Food and Drug Administration requirements, it is necessary to deposit one of the acceptable dyes on a pharmaceutically acceptable carrier such as aluminum hydroxide. As an example, F.D. and C. Red #3 may be deposited on aluminum hydroxide.

When the foregoing composition is applied to tablets according to the process of the invention, it is possible to provide a suitable coating for a tablet or the like with the use of a relatively few coats or applications of the coating material. A highly important advantage of this invention is that the coating composition can be very satisfactorily and successfully applied to tablet cores, i.e., uncoated tablets, too porous to be coated satisfactorily with prior art compositions. It is not necessary to add magnesium stearate to most tablet formulations to obtain a sufficiently smooth core, as has often been required using prior art coating compositions. The initial coats applied using the present composition effectively seal the pores of the uncoated tablet core and a smooth coating is readily obtained which does not show lumping or "orange peel" effect. As a consequence, a much thinner build-up of multiple coats suffices to give adequate coverage of the tablets. This results in important savings in time and materials. Hence, it is possible to completely coat a tablet in a matter of minutes with an average of from about six to eight coatings, though more coats may be used, if desired.

Even when the coating composition claimed herein is applied without coloring agent, a tablet of pleasing appearance is obtained having a colorless coating. An opaque coating may be obtained by the addition of a quantity of titanium dioxide to the composition, if desired, as by triturating or milling the requisite amount with the coating composition. Examples of other opaquing agents are: Calcium carbonate, precipitated, U.S.P., and kaolin, N.F.

The invention is most highly suitable, however, to the application of colored film coatings of the type described in which a small quantity of a suitable coloring agent, such as the dyes and pigments previously set forth, or a mixture thereof with an opaquing agent, is incorporated into the solution prior to application on the tablets. In this manner, a highly pleasing appearance is given to the tablets and the tablets may be regarded as "elegant" in the terms of the trade. The film of this invention very effectively coats the tablets so that no unpleasant taste can be perceived, but at the same time, distinctive markings punshed into the tablet core will show through very clearly and be readily discernible on the surface.

In carrying out the process of the present invention, the coating composition is first prepared as two separate solutions. The first solution consists of the water-soluble polymer of ethylene oxide, dissolved in a suitable volatile, non-aqueous solvent such as 1:1 alcohol-acetone mixture. About a 5 percent w./v. solution is prepared. Other suitable solvents include alcohol or acetone alone, as well as ethyl acetate, methylene dichloride, benzene, methanol and methylethyl ketone.

The second solution consists of cellulose acetate phthalate, dissolved in a suitable volatile, non-aqueous solvent, usually employing the same kind of solvent or solvent mixture employed in making the first solution, provided the total mixture of solvents entirely dissolves the coating materials. About a 12% w./v. solution is prepared. Usually, the second solution contains from about 4–8% w./v. of a plasticizer, in addition to coloring agents.

In making up the composition which is applied to the tablets, mixtures of from 0.5 to 2 parts of the solution of water-soluble ethylene oxide polymer per part of the second solution are measured out and admixed.

The concentrations of the water-soluble ethylene oxide polymer and cellulose acetate phthalate in their separate solutions may be varied only over rather small ranges, since solutions appreciably more concentrated than those set forth above tend to be quite viscous, while substantially more dilute solutions are of greatly diminished value in building up a film coating on tablets at an appreciable rate. However, within the limitations of the physical properties of the separate solutions, the concentrations in the separate solutions may be varied somewhat, providing the final coating solution contains from about 2–3% w./v. of the water-soluble ethylene oxide polymer and from about 5–7% w./v. of cellulose acetate phthalate.

The finished dry coating on the tablet contains from about 12–37% by weight of the water-soluble ethylene oxide polymer, from about 44–61% by weight of cellulose acetate phthalate and up to about 25% by weight of a plasticizer. Preferably, the coating contains about 25% by weight of the water-soluble ethylene oxide polymer, about 52% by weight of cellulose acetate phthalate and about 22% by weight of a plasticizer. The percent by weight of additives such as colorants is quite small and usually does not exceed several percent by weight in total amount.

The expressions "w./v." and "v./v." are used herein for their customary meaning as understood in the pharmaceutical industry; "w./v." means weight per volume, i.e., the weight of ingredient per unit volume of suspension or solution. The expression "v./v." means volume of ingredient per unit volume of suspension or solution.

*Example 1*

A tablet coating solution is made up in two parts according to the following formula.

Solution A:
  Polyox WSR–35 (ethylene oxide polymer having molecular weight >200,000)_____grams__ 5
  Alcohol, acetone (about equal parts), q.s. ad. to 100 ml.
Solution B:
  Cellulose acetate phthalate_____grams__ 12
  Diethyl phthalate _____milliliters__ 1.5
  Castor oil _____do____ 5.0
  Alcohol, acetone (about equal parts), q.s. ad. to 100 ml.

Solution A and Solution B are mixed in equal parts by volume and applied to a moving bed of tablets or granules by pouring small portions onto the tablets. As the tablets rotate, the material is distributed evenly over the surface thereof and in a few minutes' time, the solvents will have evaporated, leaving a dry, hard film. A stream of warm air is then directed on the moving bed of tablets for several minutes. Thereafter, a second coat is applied in the same manner and subsequent coats are applied until a total of six to eight coats have been applied over a period of about 20 minutes.

A short additional drying time of 20 to 30 minutes after removal of the tablets from the coating pan assures completion of drying and removal of residual solvent odors.

Tablets coated in this manner are pleasing in appearance and the film coating thereon will disintegrate in a short time either in water or gastric secretions. In the dried coating, the ethylene oxide polymer is present to the extent of about 22.5 percent by weight, the cellulose acetate phthalate is present to the extent of about 54 percent by weight and diethyl phthalate and castor oil are present to the extent of about 5 and 17 percent by weight, respectively.

*Example 2*

In a manner similar to that described in Example 1, a tablet coating composition is prepared consisting of two parts by volume of Solution A per part of Solution B and applied to a moving bed of tablets.

The coated tablets present a pleasing appearance and the coating disintegrates without delay either in water or gastric secretions.

*Example 3*

In a manner similar to that described in Example 1, a tablet coating composition is prepared consisting of 1 part by volume of Solution A per 2 parts of Solution B and applied to a moving bed of tablets.

The coated tablets present a pleasing appearance and the coating disintegrates without a delay either in water or gastric secretions.

*Example 4*

A solution of Polyox WSR–35 ethylene oxide polymer in alcohol-acetone (1:1), and a solution of cellulose acetate phthalate, diethyl phthalate and castor oil in alcohol-acetone (1:1) are prepared in the same manner as Solutions A and B, respectively, in Example 1. 50 milliliters of each solution are brought together with 40 milligrams of F.D. and C. Green #2 and admixed thoroughly to bring the dye into solution. Six coats of this colored composition are applied to tablets in the manner described in Example 1.

The coated tablets are green and smooth and present a pleasing appearance.

*Example 5*

A solution of Polyox WSR–35 ethylene oxide polymer in alcohol-acetone (1:1), and a solution of cellulose acetate phthalate, diethyl phthalate and castor oil in alcohol-acetone (1:1) are prepared in the same manner as Solutions A and B, respectively, in Example 1. 25 milliliters of each solution are admixed in a mortar and 25 milligrams of D. and C. Yellow #11 are triturated therein until the dye is dissolved to make a colored composition. Eight coats of this colored composition are applied to 5 grain aspirin tablets in the manner described in Example 1.

The tablets do not become gummy and the coating goes on smoothly. Embossed lettering on the tablets is not obscured. The coated tablets are yellow and smooth and present a pleasing appearance.

*Example 6*

A solution of Polyox WSR–35 ethylene oxide polymer in alcohol-acetone (1:1), and a solution of cellulose acetate phthalate, diethyl phthalate and castor oil in alcohol-acetone (1:1) are prepared in the same manner as Solutions A and B. 25 milliliters of each solution are admixed in a mortar and triturated with 150 milligrams of Mapico AN–3 (red iron oxide) until the pigment is dispersed in the composition. Eight coats of this colored composition are applied to tablets in the manner described in Example 1.

The coated tablets are a pastel red and present a pleasing, smooth appearance.

*Example 7*

A solution of Polyox WSR–35 ethylene oxide polymer in alcohol-acetone (1:1), and a solution of cellulose acetate phthalate, diethyl phthalate and castor oil in alcohol-acetone (1:1) are prepared in the same manner as Solutions A and B. 100 milliliters of each solution are placed in a small ball mill along with 200 milligrams of a lake formed by depositing F.D. and C. Red #3 on aluminum hydroxide. The mixture is milled for about ¼ hour, during which time the lake is well dispersed in the composition. Eight coats of this colored composition are applied to tablets in the manner described in Example 1.

The coated tablets are red, present a pleasing, smooth appearance, and the thin film coating thereon readily disintegrates in water or gastric secretions.

In a manner similar to the foregoing examples, any of the other high molecular weight ethylene oxide polymers which are water soluble and soluble in alcohol, acetone or alcohol-acetone mixtures and the like organic solvents, and which have a molecular weight in the range of about 200,000 to 5 million, are used to prepare and apply a tablet coating composition according to the present invention. The coated tablets are very smooth and present a pleasing appearance.

I claim:

1. A coated tablet having as the coating material a thin film consisting essentially of from about 1.2 to 5 parts of cellulose acetate phthalate per part of a water-soluble ethylene oxide polymer having a molecular weight above 200,000.

2. A coated tablet having as the coating material a thin film consisting essentially of from about 1.2 to 5 parts of cellulose acetate phthalate per part of a water-soluble ethylene oxide polymer having a molecular weight above 200,000, and up to about 25% by weight of a plasticizing agent.

3. A coated tablet having as the coating material a thin film consisting essentially of from about 1.2 to 5 parts of cellulose acetate phthalate per part of a water-soluble ethylene oxide polymer having a molecular weight above 200,000, about 5 weight percent of diethyl phthalate and about 17 weight percent of castor oil.

4. A fluid cmomposition adapted for application to tablets and the like which consists essentially of from about 2–3% w./v. of a water-soluble ethylene oxide polymer having a molecular weight above 200,000 and from about 5–7% w./v. of cellulose acetate phthalate dissolved in a volatile non-aqueous solvent.

5. A fluid composition adapted for application to tablets and the like in the preparation of a film coating which consists essentially of from about 2–3% w./v. of a water-soluble ethylene oxide polymer having a molecular weight above 200,000, from about 5–7 w./v. of cellulose acetate phthalate and sufficient plasticizing agent, to provide up to about 25% by weight plasticizing agent in the finished film coating, dissolved in a volatile non-aqueous solvent.

6. A fluid composition adapted for application to tablets and the like which consists essentially of from about 2–3% w./v. of a water-soluble ethylene oxide polymer having a molecular weight above 200,000 and from about 5–7% w./v. of cellulose acetate phthalate dissolved in a non-aqueous solvent consisting essentially of about equal parts by volume of alcohol and acetone.

7. A fluid composition adapted for application to tablets and the like in the preparation of a film coating which consists essentially of from about 2–3% w./v. of a water-soluble ethylene oxide polymer having a molecular weight above 200,000 and a melt viscosity at 150° C. in the range of 15,000 to 16,000 poises, from about 5–7% w./v. of cellulose acetate phthalate and sufficient plasticizing agent, consisting of a mixture of diethyl phthalate and castor oil, to provide about 5% w./v. diethyl phthalate and about 17% w./v. of castor oil in the finished coating, dissolved in a non-aqueous solvent consisting essentially of about equal parts by volume of alcohol and acetone.

References Cited in the file of this patent

UNITED STATES PATENTS

| | | |
|---|---|---|
| 1,987,114 | Kollek | Jan. 8, 1935 |
| 2,149,005 | Bockmuhl et al. | Feb. 28, 1939 |
| 2,881,085 | Endicott et al. | Apr. 7, 1959 |
| 2,957,804 | Shuyler | Oct. 25, 1960 |

FOREIGN PATENTS

| | | |
|---|---|---|
| 109,438 | Australia | Jan. 11, 1940 |
| 762,229 | Great Britain | Nov. 28, 1956 |
| 764,342 | Great Britain | Dec. 28, 1956 |

OTHER REFERENCES

Gross et al.: "Transformulation to Filmcoating," Drug and Cosmetic Industry, vol. 86, No. 2, pp. 170–171, 264, 288–291, February 1960.

Martin et al.: "Husa's Pharmaceutical Dispensing," 5th ed., pp. 93–100; pp. 577–590, published 1959, Mack Publishing Co., Easton, Pa.

Jenkins et al.: "Scoville's The Art of Compounding," 9th ed., pp. 75–79; 86–89; 91–92; 105–108; published 1957, McGraw-Hill Book Co., New York, N.Y.

Martin et al.: "Remington's Practice of Pharmacy," 11th ed., pp. 400–419; published 1956, Mack Publishing Co., Easton, Pa.

Micciche: "La Preparazione di Medicamenti per Uso Orale a Cessione Ritardate Prestabilita" (Oral Medicinal Preparation With Fixed Retardation of Release), Bolletino Chimico Farmaceutico, Milan, vol. 94, pp. 485–493 (1955).

Abstracted in Chem. Abstracts, vol. 50, No. 7, #5242f–g–h, April 10, 1956; Official Patent Office translation (16 pp.) available.

Chapman et al.: "Physiological Availability of Drugs in Tablets," Canad. Med. Assn. J., vol 76, pp. 102–106, Jan. 15, 1957.

Dragstedt: "Oral Medication With Preparations for Prolonged Action," J.A.M.A., vol., 160, No. 12, pp. 1652–1655, Nov. 22, 1958.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to In Vivo Tablet Availability of Drugs), May 1959.

Campbell et al.: "Oral Prolonged Action Medication," Practitioner, vol. 183, pp. 758–765, December 1959.